US008724472B2

(12) United States Patent
Huang et al.

(10) Patent No.: US 8,724,472 B2
(45) Date of Patent: *May 13, 2014

(54) DATA RADIO BEARER MAPPING IN A TELECOMMUNICATION NETWORK WITH RELAYS

(75) Inventors: Xiaolong Huang, San Diego, CA (US); Fatih Ulupinar, San Diego, CA (US); Parag Arun Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

This patent is subject to a terminal disclaimer.

(21) Appl. No.: 13/071,166

(22) Filed: Mar. 24, 2011

(65) Prior Publication Data

US 2011/0235514 A1    Sep. 29, 2011

Related U.S. Application Data

(60) Provisional application No. 61/317,629, filed on Mar. 25, 2010.

(51) Int. Cl.
*H04J 1/16* (2006.01)
*H04J 3/16* (2006.01)

(52) U.S. Cl.
USPC ............................. 370/236; 370/252; 370/465

(58) Field of Classification Search
USPC ........................ 370/230, 235, 236, 252, 465
See application file for complete search history.

(56) References Cited

U.S. PATENT DOCUMENTS

| 2007/0053363 | A1* | 3/2007 | Chen et al. | 370/395.21 |
| 2010/0034083 | A1 | 2/2010 | Prakash et al. | |
| 2010/0103863 | A1 | 4/2010 | Ulupinar et al. | |
| 2011/0085471 | A1* | 4/2011 | Zhang | 370/254 |
| 2011/0206094 | A1* | 8/2011 | Zhang et al. | 375/211 |
| 2012/0002594 | A1* | 1/2012 | Racz et al. | 370/315 |
| 2012/0287845 | A1* | 11/2012 | Yi et al. | 370/315 |

FOREIGN PATENT DOCUMENTS

| EP | 2259651 A1 | 12/2010 |
| JP | 2012529206 A | 11/2012 |
| WO | WO2010118426 A2 | 10/2010 |
| WO | WO-2010139388 A1 | 12/2010 |

OTHER PUBLICATIONS

3rd Generation Partnership Project-Technical Specification Group Radio Access Network; Evolved Universal Terrestrial Radio Access (E-UTRA); Relay architectures for E-UTRA (LTE-Advanced)(Release 9), 3GPP Draft; R2-101608 TR 36806 V022 Clean, 3rd Generation Partnership Project (3GPP), Mobile Competence Centre ; 650, Route Des Lucioles; F-06921 Sophia-Antipolis Cedex; France, vol. RAN WG2, No. San Francisco, USA; 20100222, Feb. 24, 2010, XP050421955 [retrieved on Feb. 24, 2010].

(Continued)

*Primary Examiner* — Andrew Lee
(74) *Attorney, Agent, or Firm* — Michael J. DeHaemer, Jr.

(57) ABSTRACT

Certain aspects of the present disclosure relate to techniques for operating a relay having a first plurality of radio bearers (RBs) that interface with a donor base station and having a second plurality of RBs that interface with at least one user equipment (UE). According to certain aspects, the techniques generally include mapping each of the second plurality of RBs to one of the first plurality of RBs based on a QoS class identifier (QCI) associated therewith.

28 Claims, 6 Drawing Sheets

(56) References Cited

OTHER PUBLICATIONS

Huawei et al., "EPC impact analysis of different Relay alternatives", 3GPP Draft; R3-092185, 3rd Generation Partnership Project (3GPP), Mobile Competence Centre; 650, Route Des Lucioles; F-06921 Sophia-Antipolis Cedex; France, No. Miyazaki; Oct. 12, 2009, XP050391735 [retrieved on Oct. 2, 1009].

Institute for Information Industry (III) et al: "Investigating head-of-line blocking issue among four relay alternatives", 3GPP Draft; R3-092735 Relay HOL, 3rd Generation Partnership Project (3GPP), Mobile Competence Centre; 650, Route Des Lucioles; F-06921 Sophia-Antipolis Cedex; France, No. Jeju; Nov. 9, 2009, XP050392238 [retrieved on Nov. 15, 2009].

International search report and written opinion—PCT/US2011/030063, ISA/EPO—Jul. 5, 2011.

Qualcomm Europe: "Relays QoS Support", 3GPP Draft; R2-094306, 3rd Generation Partnership Project (GPP), Mobile Competence Centre; 650, Route Des Lucioles; F-06921 Sophia-Antipolis Cedex; France, No. Beijing; 20091109, Aug. 24, 2009, XP050384481[retrieved on Nov. 15, 2009].

LG Electronics Inc., "Bearer Mapping in Relay Node", 3GPP TSG-RAN2 Meeting #66, May 8, 2009, R2-092845, p. I-4.

\* cited by examiner

DATA RADIO BEARER MAPPING IN A TELECOMMUNICATION NETWORK WITH RELAYS

CLAIM OF PRIORITY UNDER 35 U.S.C. §119

The present Application for patent claims benefit of Provisional Application Ser. No. 61/317,629, entitled "Un Data Radio Bearer Mapping in a Telecommunication Network with Relays", filed Mar. 25, 2010, and assigned to the assignee hereof and hereby expressly incorporated by reference herein.

BACKGROUND

1. Field

Certain aspects of the disclosure relate generally to wireless communications systems and, more particularly, to techniques for managing radio bearers in telecommunication networks with relays.

2. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Wireless communication systems may comprise a donor base station that communicates with wireless terminals via a relay base station. The relay base station may communicate with the donor base station via a backhaul link and with the terminals via an access link. In other words, the relay base station may receive downlink messages from the donor base station over the backhaul link and relay these messages to the terminals over the access link. Similarly, the relay base station may receive uplink messages from the terminals over the access link and relay these messages to the donor base station over the backhaul link. The relay base station may, thus, be used to supplement a coverage area and help fill "coverage holes."

Generally, a bearer is defined as a packet flow with a defined Quality of Service (QoS) between a gateway and a user equipment (UE). In telecommunication networks with relay nodes, bearers employed for packet flows between a relay node and its served UEs (referred to as "Uu bearers") are carried by data radio bearers (DRBs) employed for relay packet flows between the relay node and a donor base station (DeNB) associated therewith (referred to as "Un data radio bearers"). Additionally, Un data radio bearers may carry data flows for relay node signaling.

SUMMARY

Certain aspects of the present disclosure provide a method for operating a relay having a first plurality of radio bearers (RBs) that interface with a donor base station and having a second plurality of RBs that interface with at least one user equipment (UE). The method generally includes mapping each of the second plurality of RBs to one of the first plurality of RBs based on a QoS class identifier (QCI) associated therewith. Certain aspects of the present disclosure provide a computer program product comprising a computer readable medium having instructions for operating a relay having a first plurality of radio bearers (RBs) that interface with a donor base station and having a second plurality of RBs that interface with at least one user equipment (UE) stored thereon. The instructions are generally executable by one or more processors for operating a relay having a first plurality of radio bearers (RBs) that interface with a donor base station and having a second plurality of RBs that interface with at least one user equipment (UE). The method generally includes mapping each of the second plurality of RBs to one of the first plurality of RBs based on a QoS class identifier (QCI) associated therewith.

Certain aspects of the present disclosure provide an apparatus for operating a relay having a first plurality of radio bearers (RBs) that interface with a donor base station and having a second plurality of RBs that interface with at least one user equipment (UE). The apparatus generally includes means for mapping each of the second plurality of RBs to one of the first plurality of RBs based on a QoS class identifier (QCI) associated therewith. Certain aspects of the present disclosure provide an apparatus for operating a relay having a first plurality of radio bearers (RBs) that interface with a donor base station and having a second plurality of RBs that interface with at least one user equipment (UE). The apparatus generally includes a mapping component configured to map each of the second plurality of RBs to one of the first plurality of RBs based on a QoS class identifier (QCI) associated therewith.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
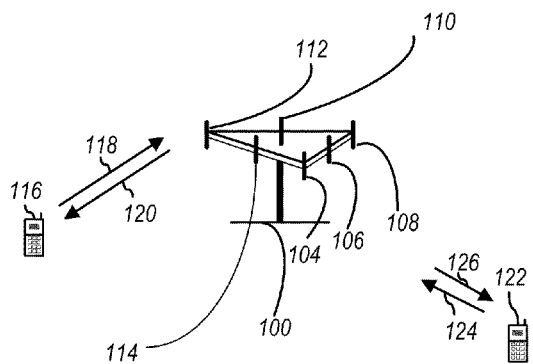
FIG. 1 illustrates a multiple access wireless communication system.

Certain aspects of the present disclosure provide apparatuses and techniques for managing radio bearers in wireless communications having a relay node and donor base station. A radio bearer of an interface between a relay node and user equipment (UE) may be referred to as a user equipment radio bearer or a "Uu" radio bearer, and a radio bearer of an interface between a relay node and an associated donor base station may be referred to as a base station radio bearer or a "Un" radio bearer. The Uu radio bearers used for UE packet flows between a relay and its served UEs need to be carried by the Un data radio bearers used for packet flows between the relay and its donor base station. Providing a one-to-one mapping between the Uu bearers and the Un data radio bearers would result in a high level of bearer handling and complexity, and may require technical specification changes. Therefore, there is a demand for techniques and apparatuses for handling radio bearer communication between a relay node and a donor base station. Additionally, there are challenges for how to map base station signaling messages onto Un radio bearers so that a relay may communicate as a base station with its served UEs.

According to certain aspects, techniques are provided for mapping one or more Uu radio bearers to a single Un radio bearer for wireless communications. According to certain aspects, the mapping may be based on a QoS parameter, specifically, a QoS class identifier (QCI) of the Uu radio bearer. Certain aspects of the disclosure provide techniques for mapping one or more Un radio bearers to an interface for relay node signaling, such as S1 application protocol (S1-AP) messages and X2 application (X2-AP) messages. Mapping of S1-AP/X2-AP interfaces to Un data radio bearer(s) described herein enables a relay node to operate as a base station for the set of one or more access terminals in communication with the relay node. In addition, various QoS Class Identifiers are established for Un data radio bearers to enable communication (e.g., delivery and reception) of S1-AP/X2-AP or other backhaul application protocol(s) for a specific packet-based telecommunication network.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Referring to FIG. 1, a multiple access wireless communication system according to certain aspects of the present disclosure is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the example shown, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

According to certain aspects, an AT 116 may be in communication with an AP by means of a radio interface having a Uu radio bearer. Further, additional APs may be interconnected with each other by means of an interface known as X2, and to an Enhanced Packet Core (EPC) by means of an S1 interface.

An access point may be a fixed station used for communicating with the terminals and may also be referred to as an access point, a Node B, evolved Node B (eNB), or some other terminology. An access terminal may also be called an access terminal, user equipment (UE), a wireless communication device, terminal, access terminal or some other terminology. Moreover, an access point can be a macrocell access point, femtocell access point, picocell access point, and/or the like.

Figure 2:
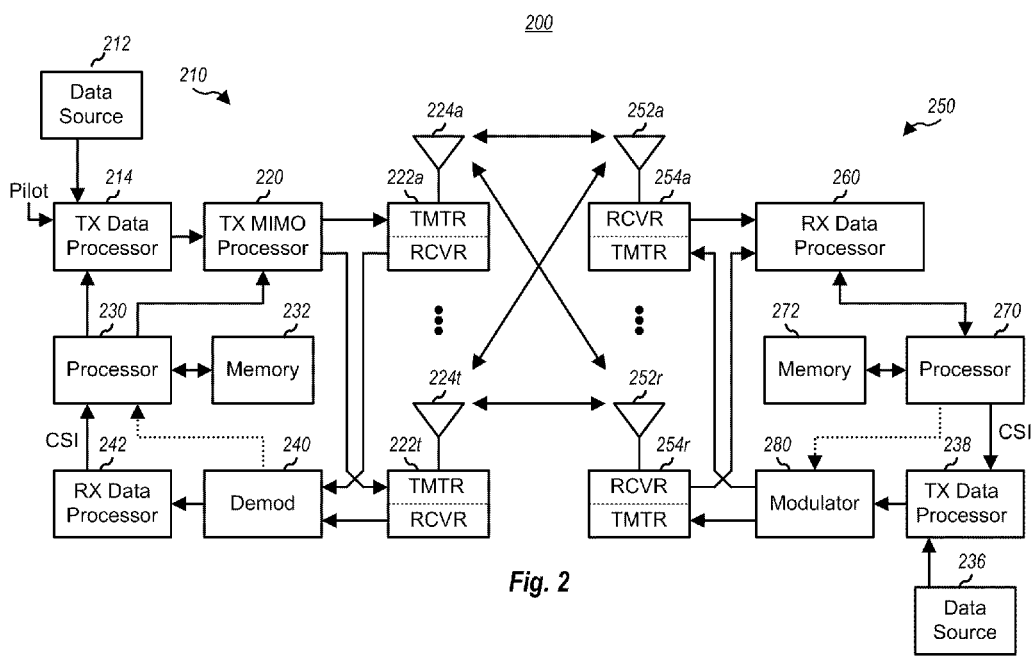
FIG. 2 is a block diagram of a communication system.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 4:
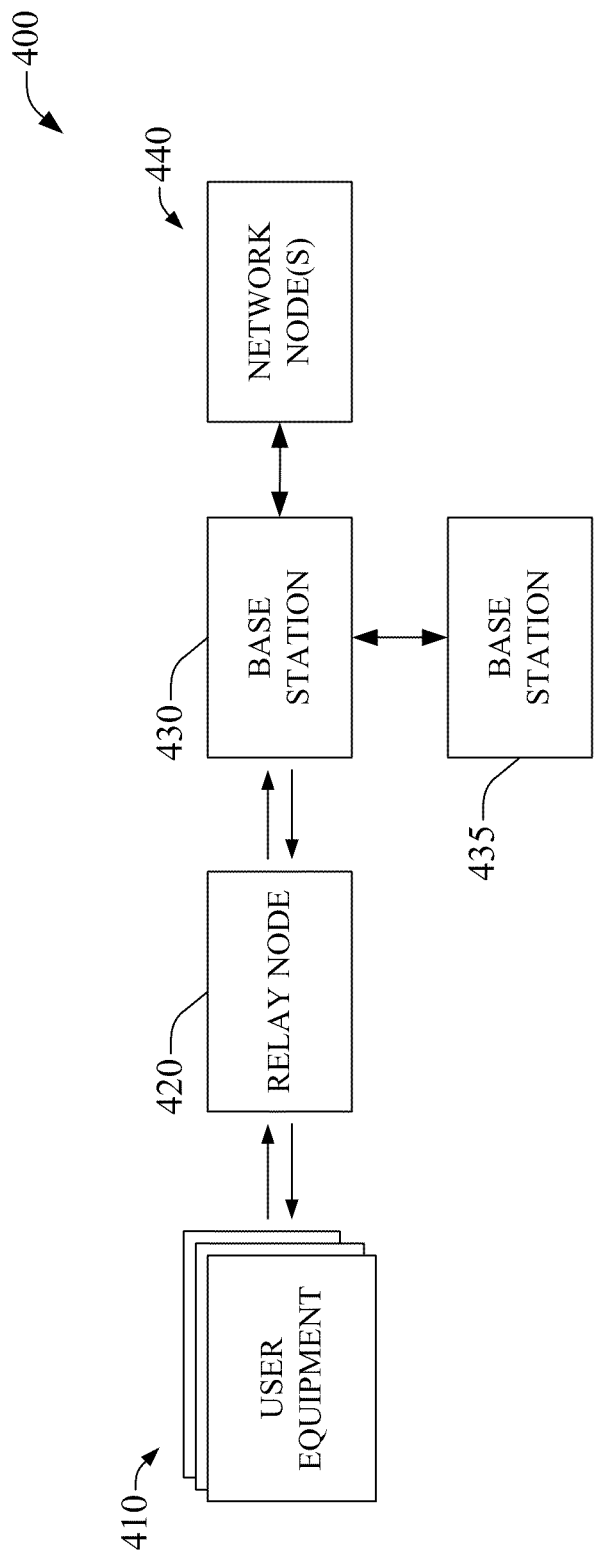
FIG. 4 is a block diagram of a wireless communication system with a relay node according to certain aspects of the disclosure.
Figure 5:
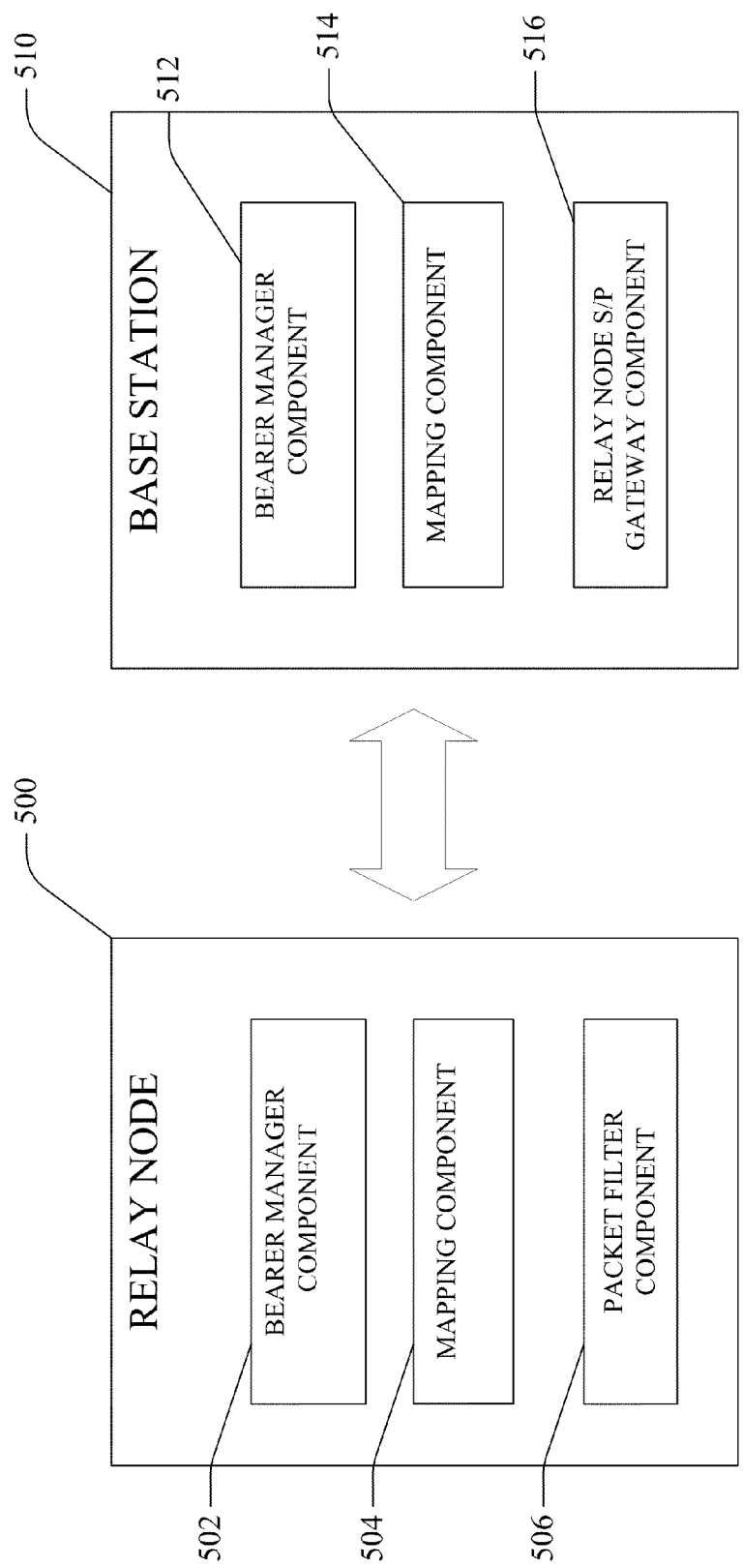
FIG. 5 illustrates exemplary communication apparatuses that manage radio bearers according to certain aspects of the subject disclosure.

According to certain aspects of the present disclosure, the transmitter system 210 includes additional components for operating in a wireless communications network having a relay node, as described in further detail below. Specifically, the transmitter system 210 may be configured as a donor base station as shown in FIGS. 4-5. In one aspect, the transmitter system 210 may be configured to establish at least one Un radio bearer to interface between the transmitter system 210 and a relay node. In another aspect, the processor 230 may be configured to determine a mapping between the Un radio bearer(s) and Uu radio bearers, which are configured to interface between the relay node and the receiver system 250.

According to certain aspects, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In an aspect, Logical Traffic Channels comprises a Dedicated Traffic Channel (DTCH) which is a Point-to-point bi-directional channel, dedicated to one UE, for the transfer of user information. Also, a Multicast Traffic Channel (MTCH) is a Point-to-multipoint DL channel for transmitting traffic data.

According to certain aspects, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)
For the purposes of the present document, the following abbreviations apply:

| ACK | Acknowledgement |
|---|---|
| AM | Acknowledged Mode |
| AMD | Acknowledged Mode Data |
| ARQ | Automatic Repeat Request |
| BCCH | Broadcast Control CHannel |
| BCH | Broadcast CHannel |

-continued

| | |
|---|---|
| BW | Bandwidth |
| C- | Control- |
| CB | Contention-Based |
| CCE | Control Channel Element |
| CCCH | Common Control CHannel |
| CCH | Control CHannel |
| CCTrCH | Coded Composite Transport Channel |
| CDM | Code Division Multiplexing |
| CF | Contention-Free |
| CP | Cyclic Prefix |
| CQI | Channel Quality Indicator |
| CRC | Cyclic Redundancy Check |
| CRS | Common Reference Signal |
| CTCH | Common Traffic CHannel |
| DCCH | Dedicated Control CHannel |
| DCH | Dedicated CHannel |
| DCI | Downlink Control Information |
| DL | DownLink |
| DRS | Dedicated Reference Signal |
| DSCH | Downlink Shared Channel |
| DSP | Digital Signal Processor |
| DTCH | Dedicated Traffic CHannel |
| E-CID | Enhanced Cell IDentification |
| EPS | Evolved Packet System |
| FACH | Forward link Access CHannel |
| FDD | Frequency Division Duplex |
| FDM | Frequency Division Multiplexing |
| FSTD | Frequency Switched Transmit Diversity |
| HARQ | Hybrid Automatic Repeat/request |
| HW | Hardware |
| IC | Interference Cancellation |
| L1 | Layer 1 (physical layer) |
| L2 | Layer 2 (data link layer) |
| L3 | Layer 3 (network layer) |
| LI | Length Indicator |
| LLR | Log-Likelihood Ratio |
| LSB | Least Significant Bit |
| MAC | Medium Access Control |
| MBMS | Multimedia Broadcast Multicast Service |
| MCCH | MBMS point-to-multipoint Control Channel |
| MMSE | Minimum Mean Squared Error |
| MRW | Move Receiving Window |
| MSB | Most Significant Bit |
| MSCH | MBMS point-to-multipoint Scheduling CHannel |
| MTCH | MBMS point-to-multipoint Traffic CHannel |
| NACK | Non-Acknowledgement |
| PA | Power Amplifier |
| PBCH | Physical Broadcast CHannel |
| PCCH | Paging Control CHannel |
| PCH | Paging CHannel |
| PCI | Physical Cell Identifier |
| PDCCH | Physical Downlink Control CHannel |
| PDU | Protocol Data Unit |
| PHICH | Physical HARQ Indicator CHannel |
| PHY | PHYsical layer |
| PhyCH | Physical CHannels |
| PMI | Precoding Matrix Indicator |
| PRACH | Physical Random Access Channel |
| PSS | Primary Synchronization Signal |
| PUCCH | Physical Uplink Control CHannel |
| PUSCH | Physical Uplink Shared CHannel |
| QoS | Quality of Service |
| RACH | Random Access CHannel |
| RB | Resource Block |
| RLC | Radio Link Control |
| RRC | Radio Resource Control |
| RE | Resource Element |
| RI | Rank Indicator |
| RNTI | Radio Network Temporary Identifier |
| RS | Reference Signal |
| RTT | Round Trip Time |
| Rx | Receive |
| SAP | Service Access Point |
| SDU | Service Data Unit |
| SFBC | Space Frequency Block Code |
| SHCCH | SHared channel Control CHannel |
| SINR | Signal-to-Interference-and-Noise Ratio |
| SN | Sequence Number |
| SR | Scheduling Request |
| SRS | Sounding Reference Signal |
| SSS | Secondary Synchronization Signal |
| SU-MIMO | Single User Multiple Input Multiple Output |
| SUFI | SUper Field |
| SW | Software |
| TA | Timing Advance |
| TCH | Traffic CHannel |
| TDD | Time Division Duplex |
| TDM | Time Division Multiplexing |
| TFI | Transport Format Indicator |
| TPC | Transmit Power Control |
| TTI | Transmission Time Interval |
| Tx | Transmit |
| U- | User- |
| UE | User Equipment |
| UL | UpLink |
| UM | Unacknowledged Mode |
| UMD | Unacknowledged Mode Data |
| UMTS | Universal Mobile Telecommunications System |
| UTRA | UMTS Terrestrial Radio Access |
| UTRAN | UMTS Terrestrial Radio Access Network |
| VOIP | Voice Over Internet Protocol |
| MBSFN | multicast broadcast single frequency network |
| MCH | multicast channel |
| DL-SCH | downlink shared channel |
| PDCCH | physical downlink control channel |
| PDSCH | physical downlink shared channel |

An Example Relay System

Figure 3:
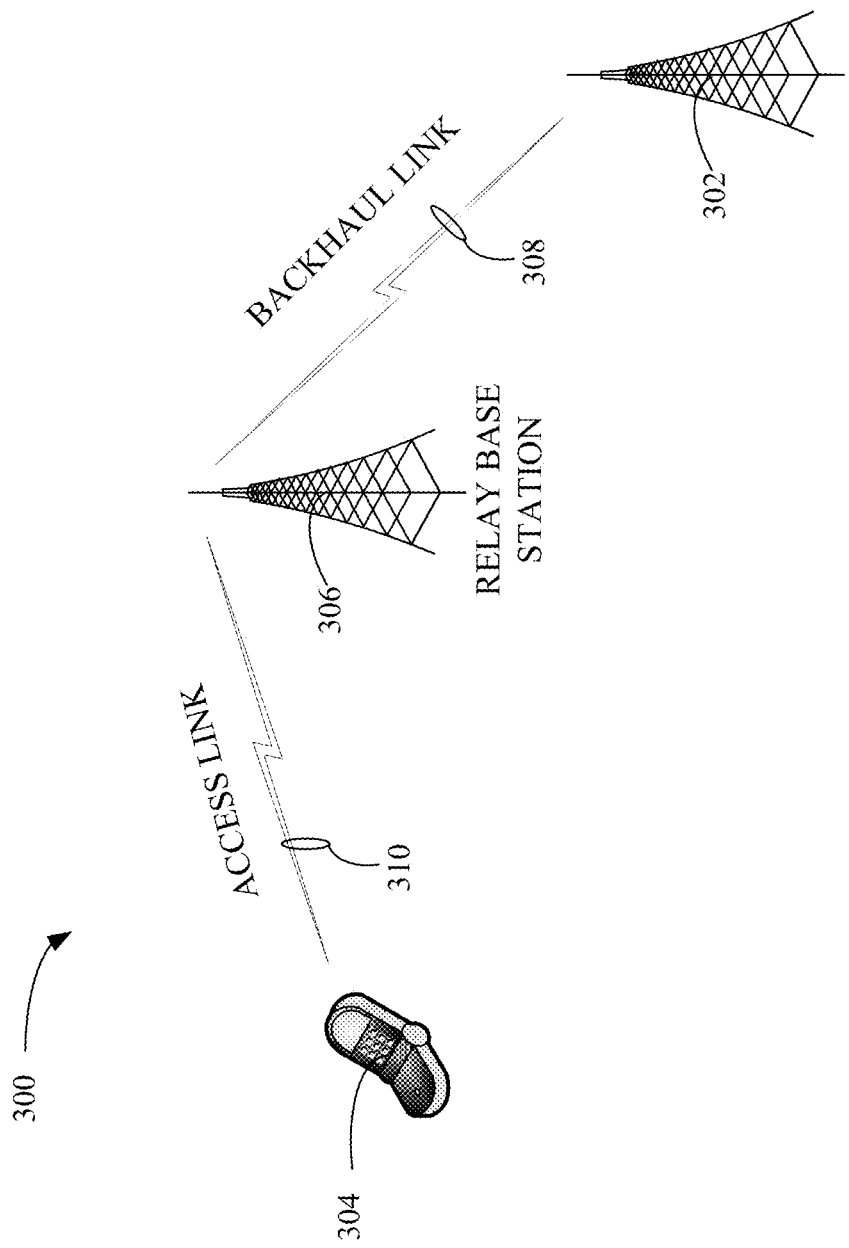
FIG. 3 illustrates an exemplary wireless communication system with a relay base station according to certain aspects of the present disclosure.

FIG. 3 illustrates an example wireless system 300 in which certain aspects of the present disclosure may be practiced. As illustrated, the system 300 includes a donor base station (BS) (also known as donor access point or DeNB) 302 that communicates with a user equipment (UE) 304 via a relay BS (also known as relay access point or relay node) 306. The relay BS 306 may communicate with the donor BS 302 via a backhaul link 308 and with the UE 304 via an access link 310.

In other words, the relay BS 306 may receive downlink messages from the donor BS 302 over the backhaul link 308 and relay these messages to the UE 304 over the access link 310. Similarly, the relay BS 306 may receive uplink messages from the UE 304 over the access link 310 and relay these messages to the donor BS 302 over the backhaul link 308. The relay BS 306 may, thus, be used to supplement a coverage area and help fill "coverage holes."

According to certain aspects, the relay BS 306 may communicate with the UE 304 (i.e., relay downlink messages to the UE and receive uplink messages from the UE) utilizing at least one Uu radio bearer configured for the access link 310. According to certain aspects, the relay BS 306 may communicate with the donor BS 302 utilizing at least one Un radio bearer configured for the backhaul link 308.

FIG. 4 illustrates a block diagram of an example system 400 that is configured to perform techniques for managing and mapping radio bearers according to certain aspects of the present disclosure. Example system 400 represents a wireless telecommunication network having a plurality of UEs 410, a relay node 420, base stations 430, 435, and a network node 440. Base station 430 operates as the donor base station of relay node 420. As such, the relay node 420 may serve multiple UEs 410 by relaying wireless communications between the UEs 410 and the donor base station 430. Multiple Uu radio bearers are utilized to carry data packet flow between the relay node 420 and the UEs 410. Similarly, multiple Un radio bearers are utilized to carry flow between the relay node 420 and the donor base station 430. According to certain aspects, the relay node 420 and donor base station 430 are configured to aggregate Uu bearers into Un data radio bearers with a many-to-one mapping.

The donor base station 430 provides communication between the plurality of UEs 410 and the at least one network node 440, which are configured to provide network services to the UEs 410. According to certain aspects, the network nodes may be an Evolved Packet Core (EPC) network node, such as a mobility management entity (MME), Packet Data Network (PDN) gateway (P-GW), or serving gateway (S-GW). The donor base station 430 may communicate with the network node 440 using signaling such as S1 application protocol (S1-AP) messaging. According to certain aspects, the donor base station 430 may relay the S1-AP messages to the relay node 420 using Un radio bearers.

The system 400 further includes an additional base station 435 inter-connected to donor base station 430 to exchange signaling information as needed. The base stations 430, 435 may inter-communicate to share load, interference, or handover related information. According to certain aspects, the base stations 430, 435 may communicate using signaling such as X2 application protocol (X2-AP) messaging. According to certain aspects, the base station 430, 435 may also exchange information with the relay node 420 so that the relay node 420 may work as a base station for its served UEs 410. According to certain aspects, the base station 430 and 435 may map an S1 or X2 interface onto a Un radio bearer utilized by the relay node 420 to communicate S1- and X2-AP messages.

FIG. 5 illustrates a relay node 500 and a donor base station 510 in communication according to certain aspects of the present disclosure. While certain aspects of the disclosure are discussed in regards to the relay node 500 and a donor base station 510, it is understood that other suitable communications apparatuses are contemplated, such as macrocell, femtocell, picocell, etc. access point, a relay node, a mobile base station, a portion thereof, and/or substantially any wireless device that transmits signals to one or more disparate devices in a wireless network. According to certain aspects, the relay node 500 and donor base station 510 may be the relay node 420 and donor base station 430 as described in FIG. 4.

The relay node 500 generally includes a bearer manager component 502, a mapping component 504, and a packet filter component 506. The bearer manager component 502 is generally configured to perform the radio bearer establishment operations described herein. For example, the bearer manager component 502 is configured to establish and support Un radio bearers and Uu radio bearers for communication with UEs and a donor base station 510. The mapping component 504 is configured to perform mapping operations described herein. According to certain aspects of the disclosure, the mapping component 504 is configured to determine a mapping between Un radio bearers and Uu radio bearers established by the bearer manager component 502. The packet filter component 506 provides a packet filter for sorting and routing packets received from UEs to a corresponding Un radio bearer according to certain aspects.

According to certain aspects, a Uu bearer established by the relay node 500 has a pre-determined QoS, which may be defined by a number of parameters. Generally, the QoS may be defined by a QoS Class Identifier (QCI), which is a scalar that is utilized as a reference to bearer level packet forwarding treatment (e.g. scheduling weights, admission thresholds, queue management thresholds, link layer protocol configuration, etc.); a Allocation and Retention Priority (ARP), which is used to decide whether a bearer establishment or modification request can be accepted or needs to be rejected in cases of resource limitations, a Guaranteed Bit Rate (GBR), which denotes the bit rate that can be expected to be provided by a GBR radio bearer, and a Maximum Bit Rate (MBR) which indicates a limit to the bit rate that can be expected to be provided by a GBR radio bearer.

According to certain aspects, the bearer manager component 502 is configured to establish a Uu radio bearer configured to interface between the relay node 500 and at least one UE. According to certain aspects, the bearer manager component 502 is configured to support a limited number of Uu bearers for each served UE (e.g., in one example, a maximum of 8 Uu bearers per UE). The bearer manager component 502 is further configured to establish Un radio bearers configured to interface between the relay node 500 and the donor base station 510. The Un radio bearers are established by the bearer manager component 502 are configured to carry a number of Uu radio bearers.

The bearer manager component 502 is generally configured to support a plurality of Un bearers. According to certain aspects, the bearer manager component 502 may be configured to support at least one Un radio bearer for each unique QCI supported by the wireless network. For example, in an LTE network, there may be 9 defined QCIs for use in Uu bearers. In such cases, the bearer manager component 502 may be configured to support at least 9 Un radio bearers in an interface with the donor base station 510. According to certain aspects, a fewer number of Un radio bearers (than defined QCIs) may be established. In such cases, Uu bearers associated with different QCIs may be mapped to a single Un bearer. According to certain aspects, a larger number of Un radio bearers (than defined QCIs) may be established. In such cases, different Uu bearers associated with a same QCI may be mapped different Un bearers (e.g., which may facilitate load balancing).

According to certain aspects, the relay node 500 is configured to handle S1-AP and X2-AP signaling processing from a wireless network over its Un radio interface and Un radio bearers. According to certain aspects, the bearer manager component 502 is configured to support at least one Un radio bearer for each of S1-AP messaging, X2-AP messaging, and Operation and Maintenance (OAM) operations, as described further below. As such, the bearer manager component 502 is configured to support at least 12 Un data radio bearers between the relay node 500 and the donor base station 510. According to certain aspects, the bearer manager component 502 is configured to support at least 16 Un data radio bearers to provide additional room for further extension. According to certain aspects, the bearer manager component 502 additionally supports at least 3 signaling radio bearers (SRBs) to support a total of 19 Un radio bearers. It is appreciated that the 19 Un radio bearers supported by certain aspects of the relay node 500 is well below the total 32 number of radio bearers allowed in an LTE MAC layer. Accordingly, the techniques provided herein advantageously do not require any over-the-air message format changes.

According to certain aspects, the donor base station 510 generally includes a bearer manager component 512, a mapping component 514, and a relay node gateway component 516. Generally, it is understood that the discussion with regards to bearer manager component 502 and mapping component 504 similarly apply to the respective components of the donor base station 510. It is further understood that the corresponding bearer manager components 502, 512 and mapping component 504, 514 may communicate using signaling and other request and response messages to perform the operations described herein. For example, the bearer manager component 502 of the relay node 500 may transmit a Un bearer establishment request to the bearer manager component 512 of the donor base station 510 to coordinate an establishment of a Un interface between the relay node 500 and donor base station 510.

The mapping component 504 generally generates a mapping between Uu bearers and Un radio bearers that maps Uu bearers having a same QoS requirement to a single Un radio bearer so as to maintain the QoS treatment for individual Uu bearers. According to certain aspects, the mapping component 504 generates a many-to-one mapping that maps Uu radio bearers having the same QCI to a single Un radio bearer.

Figure 6:
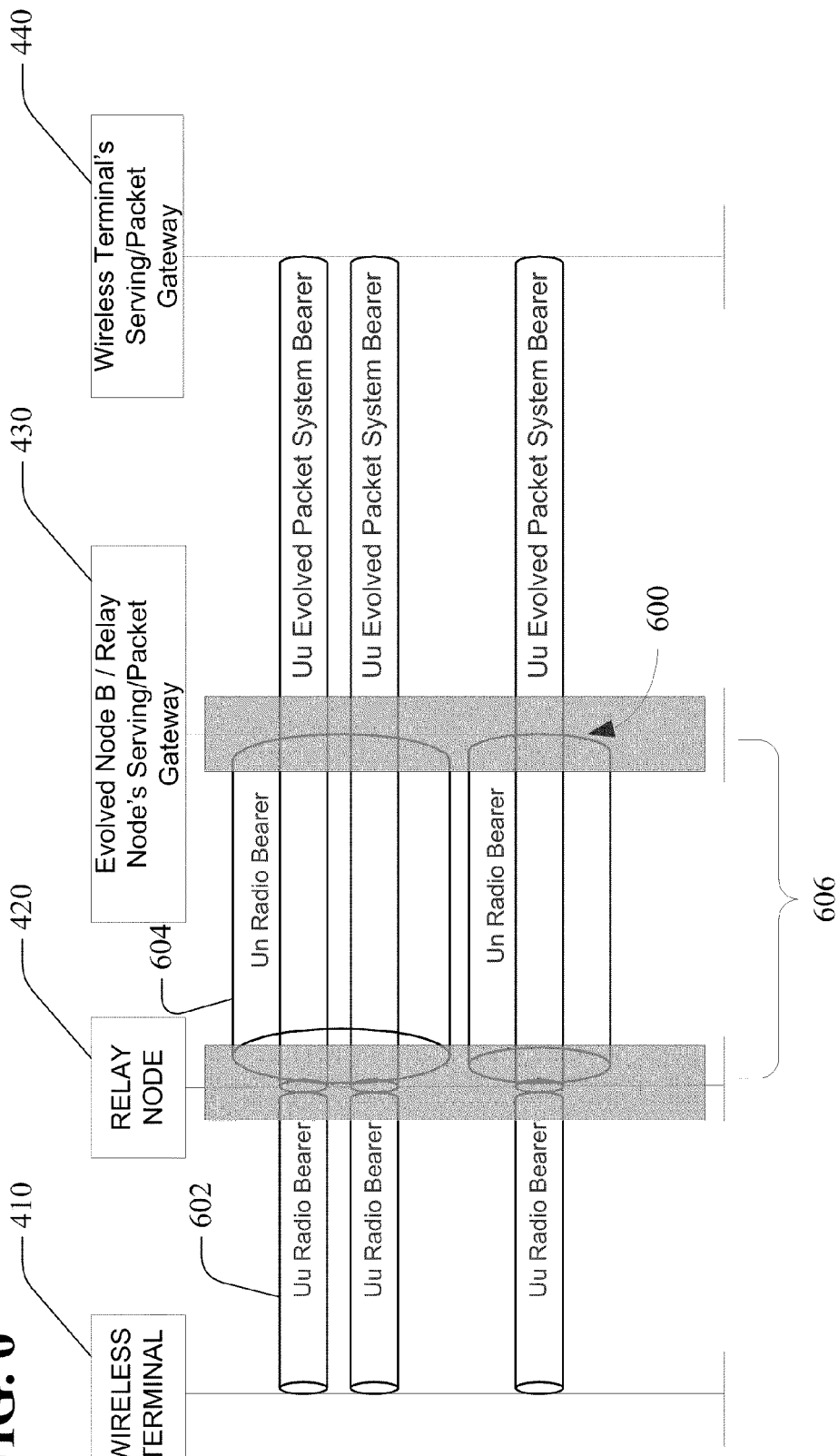
FIG. 6 illustrates an example of mapping between radio bearers in a wireless communication system according to certain aspects of the disclosure.

FIG. 6 illustrates an example of mapping 600 between Uu radio bearers 602 and Un radio bearers 604 in the example wireless communication system 400, described above, according to certain aspects of the disclosure. As shown, a plurality of Uu radio bearers 602 provide data flow between a wireless terminal 410 and the relay node 420. The plurality of Uu radio bearers 602 are mapped to a single Un radio bearer 604 in the interface 606 between the relay node 420 and donor base station 430. The mapped Uu radio bearers 602 represent data packet flow from the wireless terminals 410 to the wireless terminal's S/P-GW 440 on Uu Evolved Packet System (EPS) bearers. According to certain aspects, the relay node 420 and donor base station 430 may be the relay node 500 and donor base station 510, respectively, shown in FIG. 5.

As discussed above, certain aspects of the disclosure generate a mapping between Uu bearers 602 and Un radio bearers 604 that maps Uu bearers 602 having a similar QoS requirement to the same Un radio bearer 604 so as to maintain the QoS treatment for individual Uu bearers 602. According to certain aspects, a many-to-one mapping is generated that maps Uu radio bearers 602 having the same QCI to a single Un radio bearer 604. As shown in FIG. 6, one Un radio bearer 604 is mapped to two Uu radio bearers 602 having the same QCI for communications with the UE's S/P Gateway. Another Un radio bearer 604 is seen as mapped to only a single Uu radio bearer 602.

Certain aspects of the disclosure provide techniques to handle S1-AP and X2-AP signaling processing from a wireless network over the Un radio interface and Un radio bearers. It should be appreciated that the nature of S1-AP and X2-AP transactions may require different packet forward handling than that of Uu radio bearers. As such, the S1-AP and X2-AP interfaces are mapped to a dedicated Un data radio bearer. Moreover, it should be appreciated that it is beneficial to network operation and maintenance to have a separate Un data radio bearer for OAM operations, such as for software updates. Accordingly, mapping is generated for OAM operations to a dedicated Un data radio bearer.

According to certain aspects, mapping of S1-AP/X2-AP interfaces to Un data radio bearer(s) described below enables reception of packet flows in Uu signaling RBs in the telecommunication network with relays. S1-AP/X2-AP messages are involved in bearer setup and handover and thus are typically intended for communication to base station(s) other than the donor base station and/or network node(s). Accordingly, S1-AP/X2-AP messages generally require a low delay budget. In order to satisfy the lowest delay budget (for example, 50 ms) for a packet during UE handover, the radio link delay budget for X2-AP messages needs to be at most 12 ms or any other time interval that is sufficiently smaller to effectively not affect UE handover adversely (e.g., cause undesired communication interruptions). In scenarios where there is an additional network delay of about 20 ms, the delay budget for S1-AP/X2-AP messaging can be nearly 30 ms. To ensure proper delays, certain aspects of the subject disclosure provide a new QCI dedicated to S1-AP/X2-AP messaging.

Certain aspects of the present disclosure are configured to reuse the QCIs defined in 3GPP LTE Release 8 for the Un data radio bearer to support S1-AP/X2-AP messaging within delay budget effective to support satisfactory delays. According to certain aspects, a Un radio bearer may be established dedicated to S1-AP/X2-AP messaging having a QCI value of QCI=3 or QCI=5 for S1/X2 messaging. It should be appreciated that QCI=3 has the minimum delay budget for all QCIs (equal to 50 ms); whereas QCI=5 has highest priority and lowest error margin.

According to certain aspects, the QCI provided for the Un radio bearer dedicated for S1-AP/X2-AP messaging has a priority equal to 1, which is a higher network priority than that of the conversational voice and which is equal to the priority of the IP Multimedia Subsystem signaling. In such embodiment, delay budget can be within the interval ~30 ms through ~50 ms. According to certain aspects, the resource type associated with above-mentioned QCI can be Non-GBR.

According to certain aspects of the present disclosure, to map S1-AP/X2-AP messages to a Un interface data radio bearer, the wireless network may create a dedicated Un data radio bearer with a specific packet filter. For downlink communications, since a donor base station may have visibility of individual Uu bearers, the donor base station may correctly filter S1-AP/X2-AP messages into the corresponding dedicated Un data radio bearer. For uplink communications, a network node, such as the MME 440, can generate a Traffic Flow Template (TFT) based on the S1-AP/X2-AP messaging mapped to a dedicated Un data radio bearer such that a relay node associated with a donor base station can filter S1-AP/X2-AP messages using the specified TFT. According to certain aspects, the relay node receives a TFT from a network node, wherein the TFT indicates a packet filter configuration for filtering packets to a predetermined Un radio bearer.

According to certain aspects of the subject disclosure, a generated TFT indicating a dedicated Un DRB for S1-AP/X2-AP message communication can utilize a protocol number and a destination port number. According to certain aspects, the protocol number may be a Stream Control Transport Protocol (SCTP) protocol number, and the destination port numbers for 51 and X2 messaging may be provided by a wireless communications standards such as LTE.

A relay node according to certain aspects is configured to support a transport protocol for S1-AP/X2-AP messaging including SCTP. According to certain aspects, the Un data radio bearer dedicated for S1-AP/X2-AP messaging is configured to utilize an Unacknowledged Mode (UM) transmission mode at a Radio Link Control (RLC) layer of the Un data radio bearer. Accordingly, when multiple S1 and X2 interfaces are multiplexed into a single Un data radio bearer as part of mapping techniques described above, certain aspects of the disclosure advantageously do not cause head of line blocking when there is a radio link failure because no RLC level packet retransmissions occur under UM operation. It is further understood that without RLC level packet retransmissions for error recovery, SCTP that terminates on both ends of the Un interface between a relay node and a donor base station can recover control packet transmission errors sufficiently quickly to retain satisfactory or effective S1-AP/X2-AP messaging.

Figure 7:
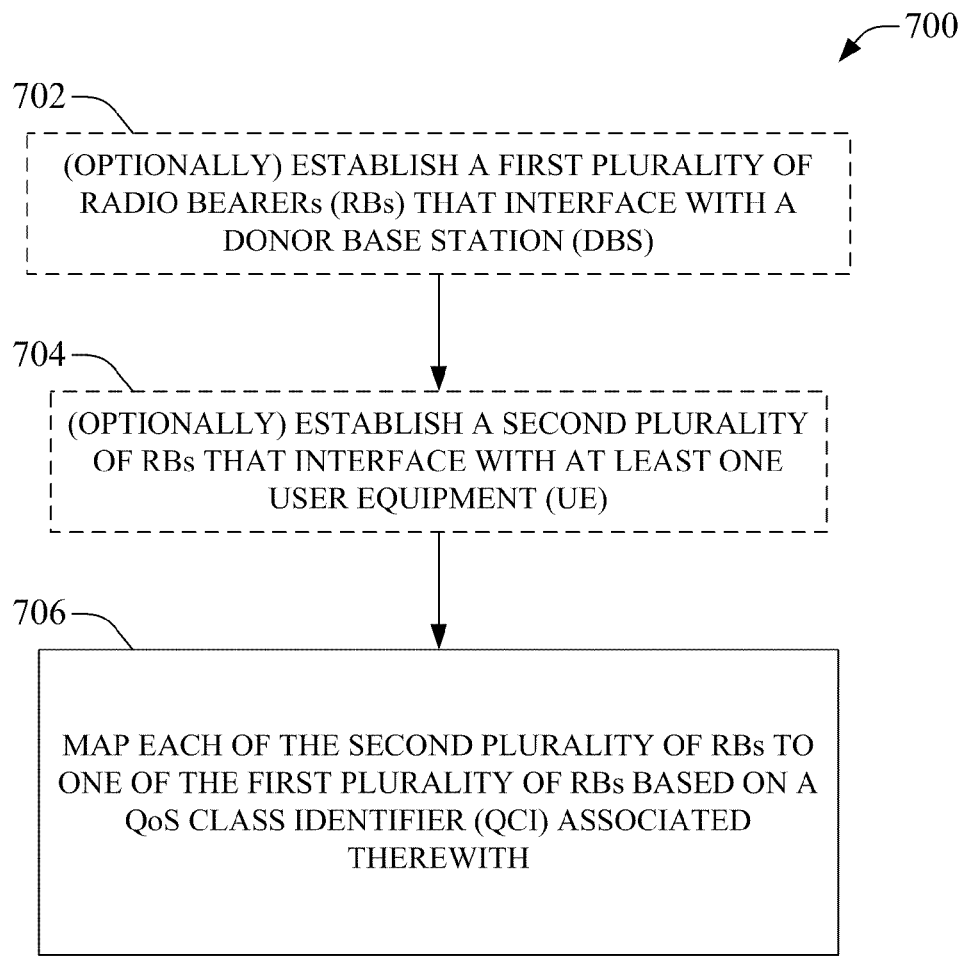
FIG. 7 illustrates example operations that may be performed by a communications apparatus according to certain aspects of the present disclosure.

FIG. 7 illustrates example operations 700 that may be performed, for example, by a relay node having a first plurality of radio bearers (RBs) that interface with a donor base station and having a second plurality of RBs that interface with at least one user equipment (UE).

The operations 700 begin, at 702, by optionally establishing the first plurality of (Un) RBs between the relay node and a base station (e.g., donor Node B). At 704, the relay node optionally establishes the second plurality of (Uu) RBs between the relay node and at least one UE. These steps may be considered optional as, the actual establishment of RBs may involve operations performed at an entity other than the relay station, such as at the donor base. At 706, the rely node maps each of the second plurality of RBs to one of the first plurality of RBs based on a QoS class identifier (QCI) associated therewith.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for operating a relay having a first plurality of radio bearers (RBs) that interface with a donor base station and having a second plurality of RBs that interface with at least one user equipment (UE), the method comprising:
    mapping each of the second plurality of RBs to one of the first plurality of RBs based on a QoS class identifier (QCI) associated therewith;
    determining a mapping of one of the first plurality of RBs to an application protocol message; and
    receiving a traffic flow template (TFT) generated based on the mapping of one of the first plurality of RBs to the application protocol message.

2. The method of claim 1, wherein the mapping comprises mapping RBs of the second plurality of RBs having a same QCI to a same one of the first plurality of RBs.

3. The method of claim 1, wherein each of the first plurality of RBs corresponds to a unique QoS class identifier.

4. The method of claim 1, wherein at least one of the first plurality of RBs corresponds to more than one unique QoS class identifier.

5. The method of claim 1, wherein the application protocol message comprises at least one of an S1 or X2 application protocol message.

6. A method for operating a relay having a first plurality of radio bearers (RBs) that interface with a donor base station and having a second plurality of RBs that interface with at least one user equipment (UE), the method comprising:
    mapping each of the second plurality of RBs to one of the first plurality of RBs based on a QoS class identifier (QCI) associated therewith;
    determining a mapping of one of the first plurality of RBs to an application protocol message; and
    transmitting the one of the first plurality of RBs mapped to the application protocol message utilizing a stream control transmission protocol (SCTP) at a radio link control (RLC) layer.

7. An apparatus having a first plurality of radio bearers (RBs) that interface with a donor base station and having a second plurality of RBs that interface with at least one user equipment (UE), the apparatus comprising:
    a mapping component configured to map each of the second plurality of RBs to one of the first plurality of RBs based on a QoS class identifier (QCI) associated therewith, wherein the mapping component is further configured to determine a mapping of one of the first plurality of RBs to an application protocol message; and
    a packet filter component configured to receive a traffic flow template (TFT) generated based on the mapping of one of the first plurality of RBs to the application protocol message.

8. The apparatus of claim 7, wherein the mapping component is further configured to map RBs of the second plurality of RBs having a same QCI to a same one of the first plurality of RBs.

9. The apparatus of claim 7, wherein each of the first plurality of RBs corresponds to a unique QoS class identifier.

10. The apparatus of claim 7, wherein at least one of the first plurality of RBs corresponds to more than one unique QoS class identifier.

11. The apparatus of claim 7, wherein the application protocol message comprises at least one of an S1 or X2 application protocol message.

12. An apparatus having a first plurality of radio bearers (RBs) that interface with a donor base station and having a second plurality of RBs that interface with at least one user equipment (UE), the apparatus comprising:
- a mapping component configured to map each of the second plurality of RBs to one of the first plurality of RBs based on a QoS class identifier (QCI) associated therewith, wherein the mapping component is further configured to determine a mapping of one of the first plurality of RBs to an application protocol message; and
- a transmitter component configured to transmit the one of the first plurality of RBs mapped to the application protocol message utilizing a stream control transmission protocol (SCTP) at a radio link control (RLC) layer.

13. An apparatus for operating a relay having a first plurality of radio bearers (RBs) that interface with a donor base station and having a second plurality of RBs that interface with at least one user equipment (UE), the apparatus comprising:
- means for mapping each of the second plurality of RBs to one of the first plurality of RBs based on a QoS class identifier (QCI) associated therewith;
- means for determining a mapping of one of the first plurality of RBs to an application protocol message; and
- means for receiving a traffic flow template (TFT) generated based on the mapping of one of the first plurality of RBs to the application protocol message.

14. The apparatus of claim 13, wherein the means for mapping comprises means for mapping RBs of the second plurality of RBs having a same QCI to a same one of the first plurality of RBs.

15. The apparatus of claim 13, wherein each of the first plurality of RBs corresponds to a unique QoS class identifier.

16. The apparatus of claim 13, wherein at least one of the first plurality of RBs corresponds to more than one unique QoS class identifier.

17. The apparatus of claim 13, wherein the application protocol message comprises at least one of an S1 or X2 application protocol message.

18. An apparatus for operating a relay having a first plurality of radio bearers (RBs) that interface with a donor base station and having a second plurality of RBs that interface with at least one user equipment (UE), the apparatus comprising:
- means for mapping each of the second plurality of RBs to one of the first plurality of RBs based on a QoS class identifier (QCI) associated therewith;
- means for determining a mapping of one of the first plurality of RBs to an application protocol message; and
- means for transmitting the one of the first plurality of RBs mapped to the application protocol message utilizing a stream control transmission protocol (SCTP) and a radio link control (RLC) layer.

19. A computer program product comprising a non-transitory computer-readable medium having instructions stored thereon for operating a relay having a first plurality of radio bearers (RBs) that interface with a donor base station and having a second plurality of RBs that interface with at least one user equipment (UE) the instructions executable by one or more processors for:
- establishing a first base station radio bearer (RB) configured to interface between a donor base station and a relay node (RN);
- establishing a plurality of user equipment RBs configured to interface between the RN and at least one user equipment;
- determining a mapping of a plurality of user equipment RBs to the first base station RB, wherein the mapping maps user equipment RBs having a same quality of service (QoS) class identifier to a common base station RB;
- determining a mapping of one of the first plurality of RBs to an application protocol message; and
- receiving a traffic flow template (TFT) generated based on the mapping of one of the first plurality of RBs to the application protocol message.

20. The computer program product of claim 19, wherein the mapping comprises mapping RBs of the second plurality of RBs having a same QCI to a same one of the first plurality of RBs.

21. The computer program product of claim 19, wherein each of the first plurality of RBs corresponds to a unique QoS class identifier.

22. The computer program product of claim 19, wherein at least one of the first plurality of RBs corresponds to more than one unique QoS class identifier.

23. The computer program product of claim 19, wherein the application protocol message comprises at least one of an S1 or X2 application protocol message.

24. A computer program product comprising a non-transitory computer-readable medium having instructions stored thereon for operating a relay having a first plurality of radio bearers (RBs) that interface with a donor base station and having a second plurality of RBs that interface with at least one user equipment (UE), the instructions executable by one or more processors for:
- establishing a first base station radio bearer (RB) configured to interface between a donor base station and a relay node (RN);
- establishing a plurality of user equipment RBs configured to interface between the RN and at least one user equipment;
- determining a mapping of a plurality of user equipment RBs to the first base station RB, wherein the mapping maps user equipment RBs having a same quality of service (QoS) class identifier to a common base station RB;
- determining a mapping of one of the first plurality of RBs to an application protocol message; and
- transmitting the one of the first plurality of RBs mapped to the application protocol message utilizing a stream control transmission protocol (SCTP) at a radio link control (RLC) layer.

25. The method of claim 6, wherein the transmitting the one of the first plurality of RBs mapped to the application protocol message utilizes an unacknowledged transmission mode at the radio link control (RLC) layer

26. The apparatus of claim 12, wherein the transmitter component configured to transmit the one of the first plurality of RBs mapped to the application protocol message utilizes an unacknowledged transmission mode at the radio link control (RLC) layer.

27. The apparatus of claim 18, wherein the means for transmitting the one of the first plurality of RBs mapped to the application protocol message utilizes an unacknowledged transmission mode at the radio link control (RLC) layer.

28. The method of claim 24, wherein the transmitting the one of the first plurality of RBs mapped to the application protocol message utilizes an unacknowledged transmission mode at the radio link control (RLC) layer.

* * * * *